BINARY MULTIPLIER

Filed Aug. 25, 1958 8 Sheets-Sheet 1

INVENTORS
BYRON O. MARSHALL, JR.
JOHN D. DILLON
BY [signature]
ATTORNEY
and
[signature]
AGENT INVENTORS
BYRON O. MARSHALL, JR.
JOHN D. DILLON
BY Wade Koontz
ATTORNEY and
James S. Shannon
AGENT June 21, 1960 B. O. MARSHALL, JR., ET AL 2,941,720

BINARY MULTIPLIER

Filed Aug. 25, 1958 8 Sheets-Sheet 3

INVENTORS
BYRON O. MARSHALL, JR.
JOHN D. DILLON
BY [signature]
ATTORNEY
and
[signature]
AGENT June 21, 1960 B. O. MARSHALL, JR., ET AL 2,941,720

BINARY MULTIPLIER

Filed Aug. 25, 1958 8 Sheets-Sheet 4

INVENTORS
BYRON O. MARSHALL, JR.
JOHN D. DALLON
BY Wade Koontz
ATTORNEY and
James S. Shannon
AGENT June 21, 1960 B. O. MARSHALL, JR., ET AL 2,941,720

BINARY MULTIPLIER

Filed Aug. 25, 1958 8 Sheets-Sheet 5

INVENTORS
BYRON O. MARSHALL, JR.
JOHN D. DILLON

BY [signature]
ATTORNEY and

James S. Shannon
AGENT

June 21, 1960 B. O. MARSHALL, JR., ET AL 2,941,720

BINARY MULTIPLIER

Filed Aug. 25, 1958 8 Sheets-Sheet 6

INVENTORS
BYRON O. MARSHALL, JR.
JOHN D. DILLON
BY Wade Koontz
ATTORNEY and
James S. Shannon
AGENT INVENTORS
BYRON O. MARSHALL, JR.
JOHN D. DILLON
BY [signature]
ATTORNEY
James S. Shannon
AGENT June 21, 1960 B. O. MARSHALL, JR., ET AL 2,941,720

BINARY MULTIPLIER

Filed Aug. 25, 1958 8 Sheets-Sheet 8

INVENTORS
BYRON O. MARSHALL, JR.
JOHN D. DILLON
BY Wade Koontz
ATTORNEY
and James S. Shannon
AGENT 2,941,720

BINARY MULTIPLIER

Byron O. Marshall, Jr., Park Ridge, Ill., (120 S. La Salle St., Chicago 3, Ill.); and John D. Dillon, 1001 Riverside Drive, Indialantic, Fla.

Filed Aug. 25, 1958, Ser. No. 757,160
6 Claims. (Cl. 235—164)
(Granted under Title 35, U.S. Code (1952), sec. 266)

The invention described herein may be manufactured and used by or for the Government for governmental purposes without payment to us of any royalty thereon.

This application is a continuation-in-part of our application, Serial No. 301,007, filed July 25, 1952, now abandoned.

The invention described herein relates to binary computing apparatus and particularly to binary multiplication in which the binary numbers involved have their digits represented by distinguishable electrical signals. The object of the invention is to provide means for multiplying two multi-digit binary numbers in which the electrical signals representing the digits of the numbers may occur in either serial or parallel form. The multipliers described require, where the number of digits is greater than three, the use of binary column adders for finding the sum and carries for a column of more than three digits. An additional object of the invention, therefore, is to provide a column adder capable of use with any number of digits greater than three and employing as components simple two and three digit column adders already known in the art.

A more detailed description of the invention will be given with reference to the accompanying drawings, in which Fig. 1 is a schematic diagram of a multiplier in accordance with the invention for binary numbers in serial form;

Fig. 2 gives waveforms occurring in Fig. 1;

Figure 6:
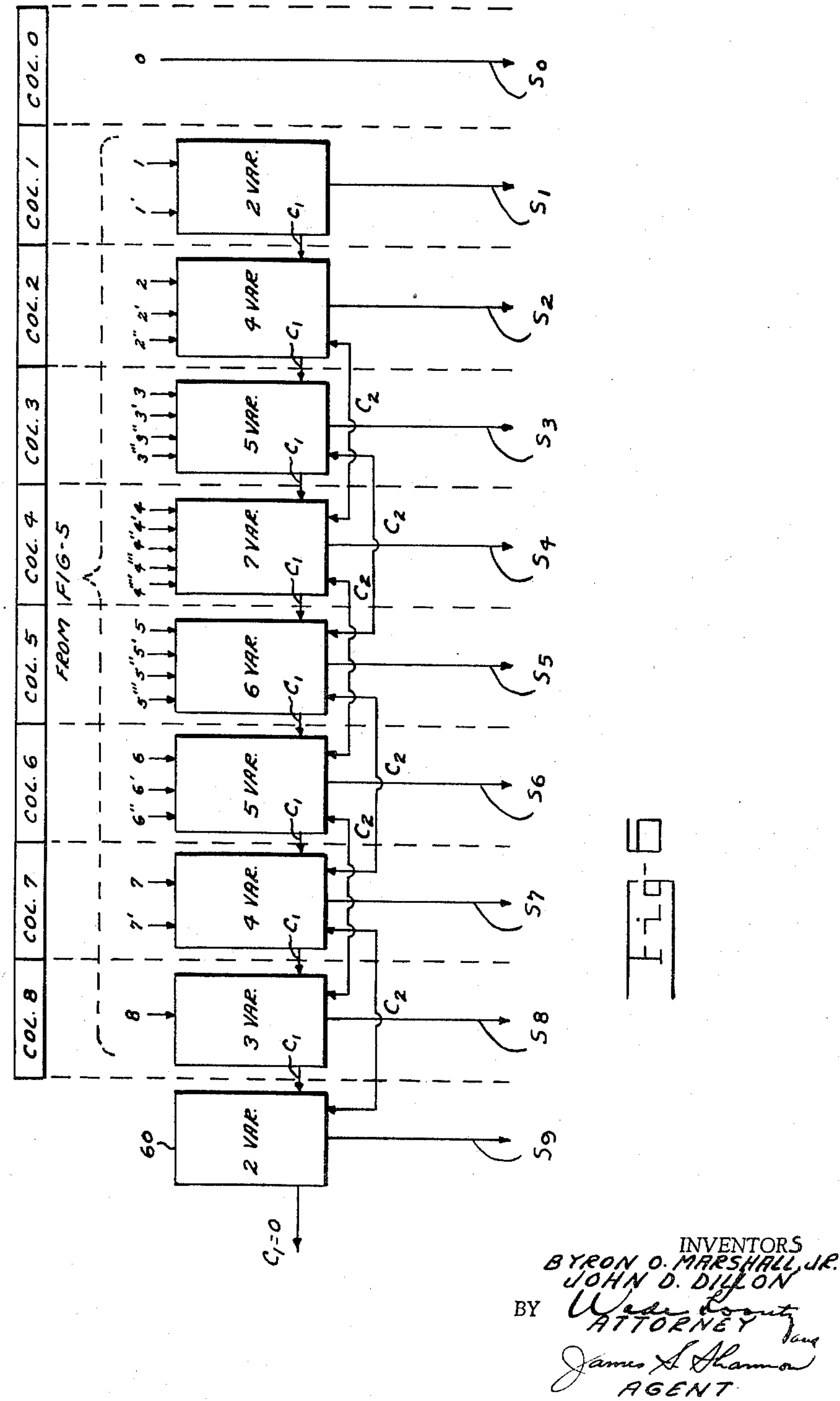
Figure 6C:
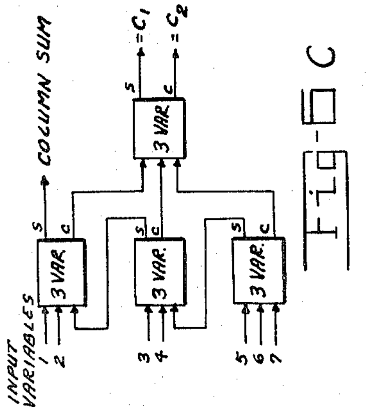
Figure 6B:
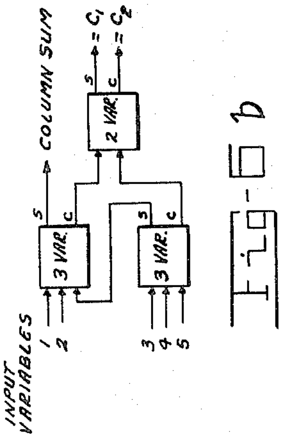
Figure 6A:
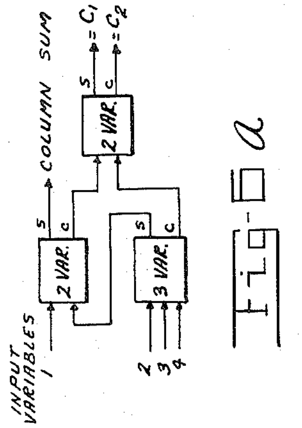
Figure 7:
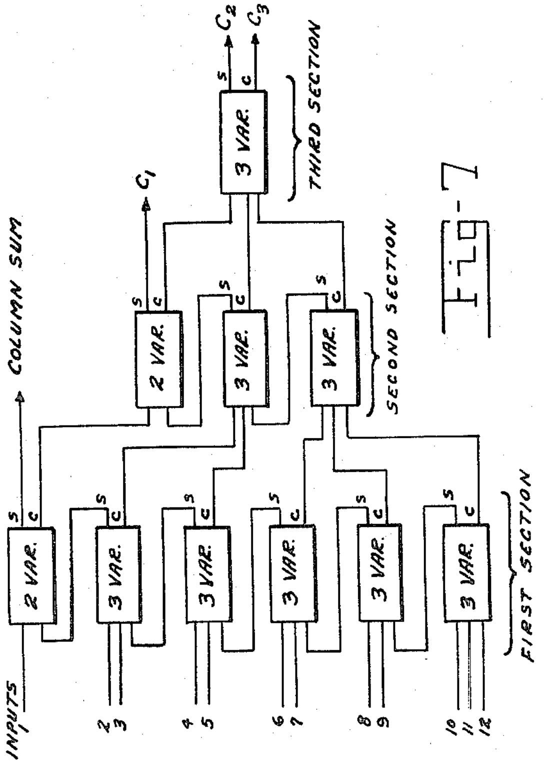
Figure 6D:
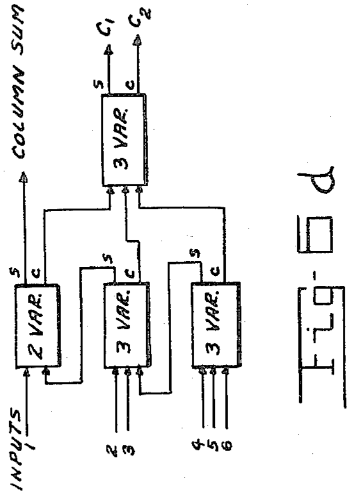
Figures 7, 8:
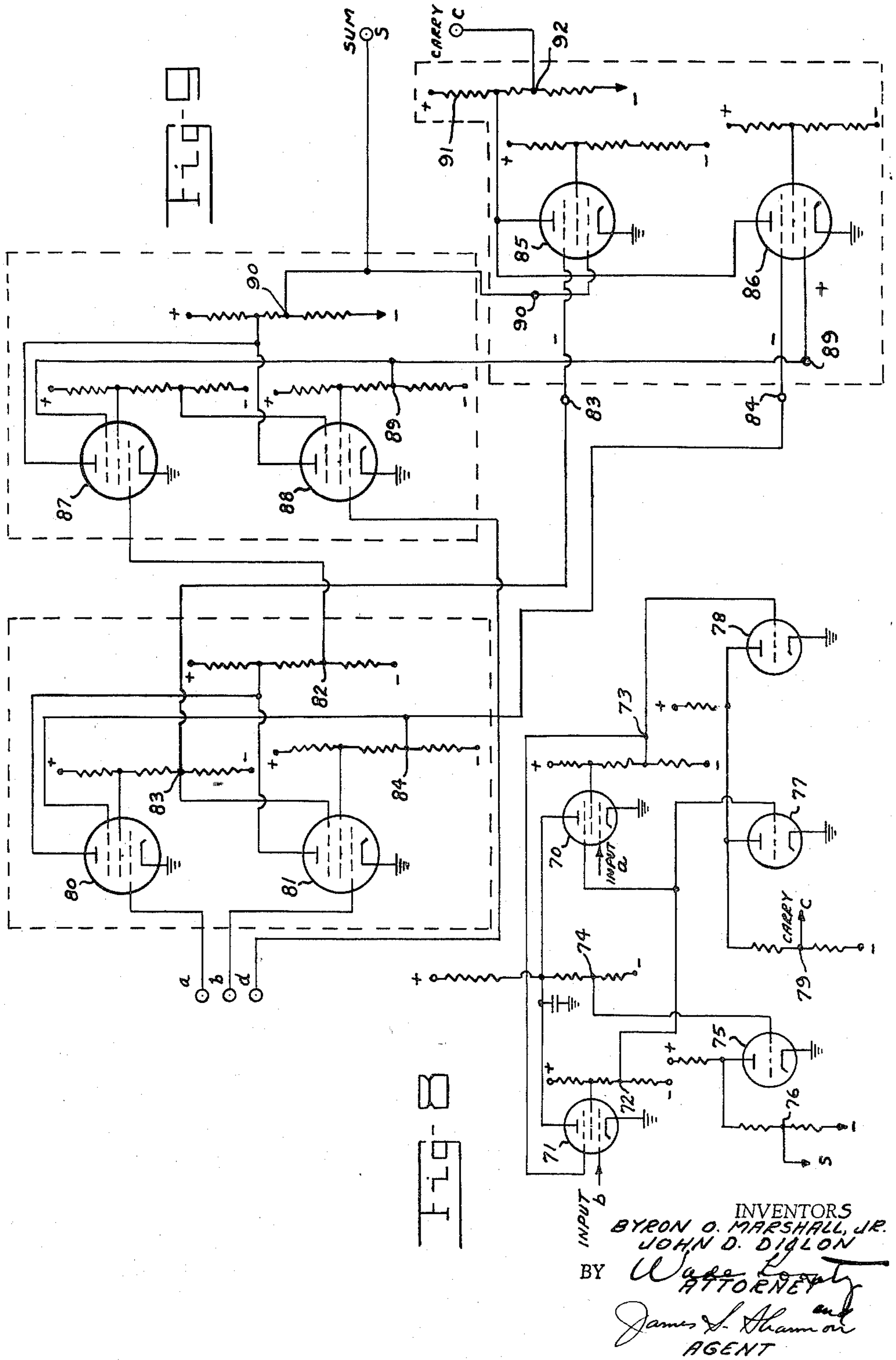

Figs. 6*a*–6*d* show column adders employed in Fig. 6;

Fig. 7 illustrates the construction of a parallel column adder for accommodating any predetermined number of column digits, in this case 12;

Fig. 8 shows a suitable basic 2-variable binary adder for use in the described column adders; and Fig. 9 shows a suitable basic 3-variable binary adder for use in the described column adders.

The multiplying apparatus described operates with binary numbers the digits 1 and 0 of which are represented by positive and negative electrical pulses, respectively. If the numbers are in serial form the pulses occur in succession separated by a fixed repetition interval T, the least significant digit occurring first. If the numbers are in parallel form the pulses representing the digits occur simultaneously in separate circuits.

A simple problem in binary multiplication is shown below.

| | |
|---:|---|
| 1101 | (multiplicand) |
| 1011 | (multiplier) |
| 1101 | (partial product) |
| 1101 | (partial product) |
| 0000 | (partial product) |
| 1101 | (partial product) |
| 10001111 | (product) |

The digit on the right is the least significant. The multiplying process consists in forming the partial products and adding the columns of partial product digits to form the final product. In serial multiplication in accordance with the invention the partial products are formed by appropriately delaying the multiplicand, and the partial products are summed by a single column adder which adds the partial product digit columns in succession starting with the least significant. The maximum number of simultaneously occurring digits that the column adder must be capable of accepting is, as seen from the above problem, equal to the number of multiplier digits. The digits of the final product appear at the output of the column adder in succession. In the parallel multiplier, a separate circuit is provided for each digit of the final product. Each circuit, save that representing the least significant digit, contains a column adder, the column adder operating simultaneously to provide the column sums, which constitute the digits of the product, and appropriate carries to higher order columns. The serial multiplying apparatus, shown in Fig. 1, will be described first.

Figure 1:
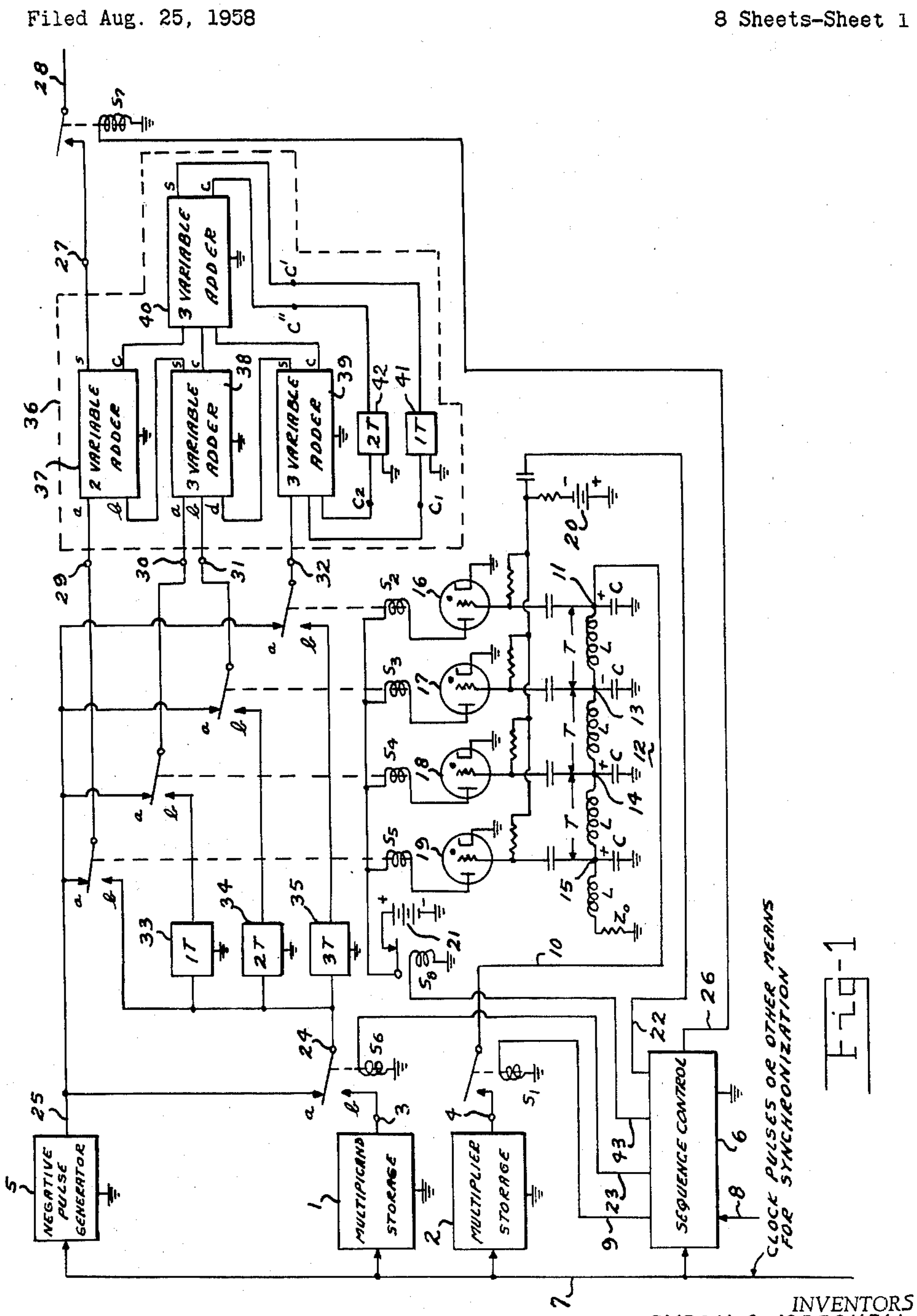

For simplicity the serial multiplying apparatus shown in Fig. 1 is restricted to multipliers and multiplicands of four digits, however, any number of digits may be accommodated by simply extending the procedures shown. To start with it will be assumed that multiplicand and multiplier, represented in serial pulse form with a positive pulse representing the binary digit 1 and a negative pulse representing the binary digit 0 and with a pulse repetition interval T, are stored in suitable storage devices 1 and 2. These storage devices may be of any suitable known type. For example, they may be delay loops around which the series of pulses representing the binary number circulates continuously with the least significant digit appearing at the output terminals 3 and 4 at definite predetermined times and followed in succession by the digits of increasingly higher order. A negative pulse generator 5 is provided and operates continuously to produce a series of negative pulses, representing binary zeros, with the pulses separated by a constant interval T. There is also provided a sequence control apparatus or circuit 6 the function of which is to control and time the various operations of the multiplier process. When the multiplier is a component of a digital computer the clock pulses provided by the computer for maintaining synchronization throughout the system would normally also be applied, as over line 7, to elements 1, 2, 5 and 6 for synchronizing purposes.

The operation of Fig. 1 will be explained with reference to the waveforms of Fig. 2 in which the numbers refer to the lines in Fig. 1 in which the waves occur. At $t_0$ a short start pulse is applied to sequence control circuit 6 over line 8. It will be assumed that the insertion of the multiplier and multiplicand into storage devices 2 and 1 was arranged so that the least significant digit of the multiplicand occurs at terminal 3 at an interval 4T later than the occurrence of the least significant digit of the multiplier at terminal 4. With this prearrangement $t_0$ is chosen as the time at which the least significant digit of the multiplier is at output terminal 4 of the multiplier storage device.

Figure 2:
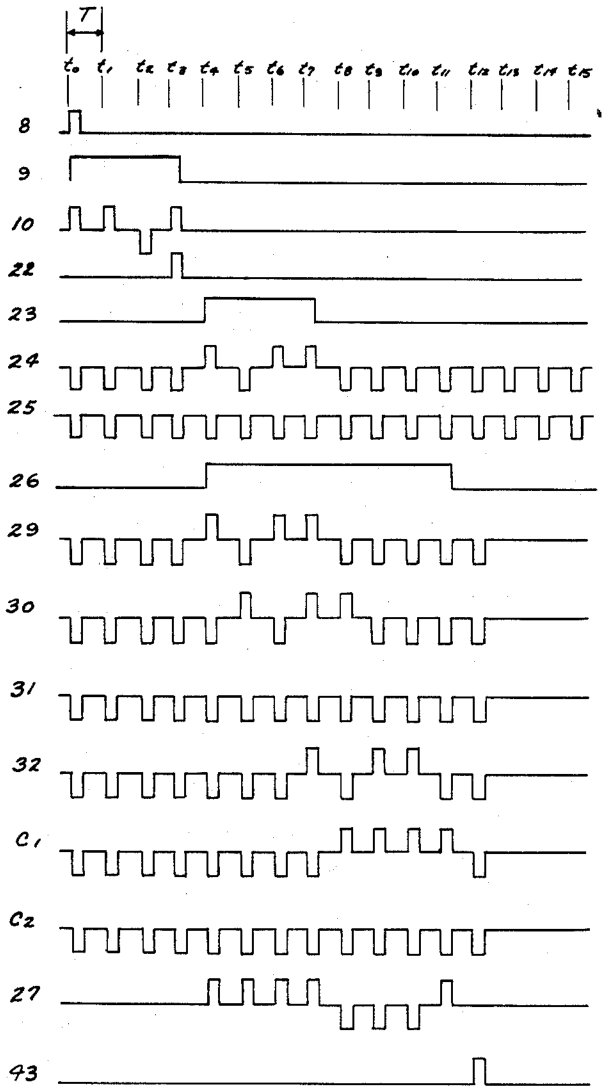

Upon application of the start pulse to circuit 6 over line 8 at $t_0$ the sequence control circuit acts to produce a steady voltage on line 9 extending from $t_0$ to slightly past $t_3$, as shown in Fig. 2. This voltage actuates switch $S_1$ which connects terminal 4 over line 10 to input terminal 11 of delay line 12 for this interval. The delay line contains at least three equal sections each made up of series inductance L and shunt capacitance C and producing a delay T. The line may be terminated in its characteristic impedance $Z_0$. Since the least significant digit of the multiplier appears at terminal 4 at $t_0$ and the most significant at $t_3$, it is apparent that at $t_3$ the four pulses representing the multiplier appear simultaneously at delay line points 11, 13, 14 and 15 with the pulse representing the least significant digit at point 15. For the problem given above, in which the multiplier is 1011, the polarities of these points at $t_3$ will be as indicated in Fig. 1.

The points 11, 13, 14 and 15 are connected through blocking condensers to the control grids of gas triodes 16, 17, 18 and 19. The grids of these triodes are biased negatively relative to their cathodes by voltage source 20. Voltage source 21 supplies positive potential to the anodes of the gas tubes through the actuating coils of switches $S_2$, $S_3$, $S_4$ and $S_5$. The gas triodes are initially nonconductive and the negative bias on their grids, supplied by source 20, is made sufficiently great that positive potentials applied to the grids as the result of pulses representing the multiplier digits travelling along delay line 12 are not able to overcome the bias and fire the tubes. However, at $t_3$, at which time pulses representing the four binary digits are at points 11, 13, 14 and 15 of the delay line, sequence control circuit 6 produces a positive pulse on line 22 which is applied simultaneously to the grids of tubes 16–19. This pulse acting alone is insufficient to overcome the bias from source 20 and fire the gas tubes, however, firing will occur when the pulse acts in combination with a positive pulse on the grid from the delay line. Accordingly, for the above problem, tubes 16, 18 and 19 will fire at $t_3$ since there are coincident positive pulses on their grids at that time. Tube 17 will not fire since the pulse applied to its grid by the delay line is negative. Firing of tubes 16, 18 and 19 actuates switches $S_2$, $S_4$ and $S_5$ to their *b* contacts.

As mentioned above, the least significant digit of the multiplicand appears at output terminal 3 of storage device 1 at an interval 4T later than the appearance at $t_0$ of the least significant digit of the multiplier at terminal 4. Therefore, the least significant digit of the multiplicand occurs at terminal 3 at $t_4$. At $t_4$ sequence control circuit 6 produces a steady voltage on line 23 which persists until slightly after $t_7$. Therefore, switch $S_6$ is actuated for this period and the series of pulses representing the multiplicand flows through contacts $S_{6b}$ to multiplicand terminal 24, least significant digit first. Prior to $t_4$ and subsequent to $t_7$, negative pulses from generator 5, which appear continuously on line 25, are applied to conductor 24 through contact $S_{6a}$. Also at $t_4$ control circuit 6 produces a voltage on line 26 which actuates $S_7$ and connects output terminal 27 of the multiplier to output line 28. The duration of this voltage is made sufficient to accommodate the final product, in this case to slightly beyond $t_{11}$, as will be seen later.

As already explained, the final product is produced by summing the columns of partial product digits (plus any carries from lower order columns) in succession starting with the least significant column. The digits of these columns appear simultaneously at partial product terminals 29, 30, 31 and 32 with the columns appearing in succession at intervals of T, the least significant column appearing first. The following analyzes the formation of the partial products and the partial product digit columns in detail:

Prior to $t_3$ negative pulses from generator 5 are continuously applied to partial product terminals 29–32 through the *a* contacts of switches $S_2$–$S_5$. In the manner explained above, these switches are set at $t_3$ in accordance with the multiplier digits, the switch being actuated if the corresponding multiplier digit is 1 and remaining unactuated if the corresponding digit is 0. Each of the terminals 29–32 that are associated with inactuated switches receives negative pulses at $t_3$ and subsequently from generator 5 through contact *a* of its associated switch. If the switch associated with any of these terminals is actuated, however, this terminal does not receive its negative pulse at $t_3$ from terminal *a* but from terminal *b* via contact $S_{6a}$ and multiplicand terminal 24. In the case of terminal 29, the negative pulse occurring at $t_3$ appeared at terminal 24 also at $t_3$. For terminal 30, the negative pulse occurring at $t_3$ appeared at terminal 24 at $t_2$ and was delayed by an interval T in delay circuit 33. Similarly, for terminals 31 and 32, the negative pulses occurring at $t_3$ appeared at terminal 24 at $t_1$ and $t_0$, respectively, and were subjected to delays of 2T and 3T by delay elements 34 and 35.

Terminal 29 is associated with switch $S_5$ which is set in accordance with the least significant digit, the multiplier. If this digit is 0, $S_5$ is not actuated and negative pulses from generator 5 continue to be applied to terminal 29 through contact $S_{5a}$. On the other hand, if the least significant digit is 1, $S_5$ will have been actuated at $t_3$ and the series of pulses representing the digits of the multiplicand are applied through contact $S_{5b}$ to terminal 29, least significant digit first, during the period $t_4$–$t_7$ and constitute the least significant partial product.

The terminal 30 is associated with switch $S_4$ which is set in accordance with the next higher order multiplier digit. If this digit is 0, $S_5$ is not actuated and negative pulses continue to be applied to terminal 30 through contact $S_{4a}$. However, if this digit is 1, $S_4$ will have been actuated at $t_3$ and the series of pulses representing the digits of the multiplicand, after a delay of 1T in delay circuit 33 are applied to terminal 30 through contact $S_{4b}$ during the interval $t_5$–$t_8$ and constitute the next higher order partial product, the delay of 1T in effect multiplying the multicplicand by $2^1$ to form the partial product. The negative pulse from generator 5 that occurred on line 24 at $t_3$, just prior to the operation of $S_6$ at $t_4$, appears at terminal 30 at $t_4$.

In a manner similar to the above, the partial products due to the third and fourth digits of the multiplier, when these digits are 1, appear at partial product terminals 31 and 32, respectively, and are produced by delaying the multiplicand by 2T and 3T to, in effect, multiply it by $2^2$ and $2^3$. Accordingly, the digits of the multiplicand appear at terminal 31 at $t_6$–$t_9$ and at terminal 32 at $t_7$–$t_{10}$. The two negative pulses from generator 5 that appeared at terminal 24 at $t_2$ and $t_3$ appear at terminal 31 at $t_4$ and $t_5$, and the three negative pulses that appeared at terminal 24 at $t_1$, $t_2$ and $t_3$ appear on terminal 32 at $t_4$, $t_5$ and $t_6$.

Shortly after $t_7$ the voltage on line 23 ceases, as seen in Fig. 2, releasing $S_6$. Therefore, negative pulses from generator 5 are restored on terminal 24 through contact $S_{6a}$ at $t_8$. Since the last digit of the multiplicand was applied to this terminal at $t_7$ there is no break in the pulses applied to those of terminals 29–32 whose associated switches ($S_2$–$S_5$) are actuated. It will therefore be apparent from the above discussion that each of terminals 29–32 will have negative pulses from generator 5 applied to it except during the time that the significant digits of the multiplicand are being applied. Fig. 2 shows, at the correspondingly numbered places, the pulses occurring at terminals 29–32 for the above given specific problem in which the multiplicand is 1101 and the multiplier is 1011.

The function of the column adder 36 is to sum the columns of digits formed by the partial products. From the above it is seen that the pulses representing these columns of digits appear on terminals 29–32 from $t_4$ to $t_{10}$. The column adder must produce the column sum of the column digits plus any carries to the particular column from lower order columns. The column sum digits constitute the digits of the final product. Allowing for one carry from the highest order column the highest order digit possible in the final product occurs at $t_{11}$. Therefore, the switch $S_7$ is actuated for the period $t_4$ to slightly beyond $t_{11}$, as explained earlier.

Because of the carries the inputs to the column adder are in two categories: the column digit or external inputs, which in Fig. 1 are the terminals 29–32, and the carry or internal inputs which in Fig. 1 are designated $C_1$ and $C_2$.

The number of external inputs always equals the number of partial products, or the number of digits in the multiplier, and is four for the 4-digit apparatus of Fig. 1. The number of carry or internal inputs depends upon the number of external inputs in a manner that will be explained later. Two carry inputs, designated $C_1$ and $C_2$, are required in Fig. 1.

The column adder 36 is a combination of basic 2-variable and 3-variable binary adders, specific examples of which will be given later. The basic 2-variable adder 37 has two input terminals *a* and *b*, a sum output terminal *s* and a carry output terminal *c*. The response of the 2-variable adder to + and − input pulses is as follows:

| Inputs *a* and *b* | *s* | *c* |
|---|---|---|
| both + | − | + |
| one +, one − | + | − |
| both − | − | − |

The basic 3-variable binary adders 38, 39 and 40 are all alike and have three inputs *a*, *b* and *d* and sum and carry outputs designated *s* and *c*. The response of the 3-variable added to + and − input pulses is as follows:

| Inputs *a*, *b*, and *d* | *s* | *c* |
|---|---|---|
| all + | + | + |
| two +, one − | − | + |
| one +, two − | + | − |
| all − | − | − |

The procedure in constructing a column adder is to cascade a sufficient number of basic 2-variable and 3-variable adders to provide enough inputs to accommodate the maximum number of column digits plus carries. In Fig. 1 there are a maximum of four-column digits (terminals 29–32) and two carries ($C_1$ and $C_2$) making a total of six inputs. These inputs are provided by the cascade of 3-variable adders 39 and 38 and 2-variable adder 37. The cascade is formed by connecting the sum (*s*) output of each basic adder to one of the inputs of the next adder in the cascade, the sum output of the last adder in the cascade being the column sum and constituting the digit of corresponding order in the final product. In Fig. 1, the column sum appears at terminal 27. The three carry outputs (*c*) produced by the cascade of basic adders are then applied as inputs to 3-variable adder 40, the sum output (*s*) of which, appearing at terminal C′, is the carry to the next higher order column and the carry output (*c*) of which, appearing at terminal C″, is the carry to the second higher order column. The column adder provides means, in the form of delay elements 41 and 42, to store these carries for periods of 1T and 2T, respectively, until the corresponding higher order column digits appear at terminals 29–32. The response of column adder 36 to pulses at the six input terminals 29–32, $C_1$ and $C_2$ is as follows:

| Inputs 29, 30, 31, 32, $C_1$, $C_2$ | 27 | C′ | C″ |
|---|---|---|---|
| all + | − | + | + |
| five +, one − | + | − | + |
| four +, two − | − | − | + |
| three +, three − | + | + | − |
| two +, four − | − | + | − |
| one +, five − | + | − | − |
| all − | − | − | − |

The wave forms occurring at input terminals 29–32, $C_1$ and $C_2$ of the column adder, and the waveform of the final product appearing at output terminal 27, are shown at the correspondingly numbered places in Fig. 2. The least significant digit of the final product occurs at $t_4$ and the latest possible occurrence of the most significant digit of the product, for the apparatus of Fig. 1, is $t_{11}$. The voltage on line 26, therefore, is terminated by the sequence control circuit 6 at slightly after $t_{11}$ and $S_7$ is released disconnecting the multiplier from the output line 28. At $t_{12}$ the sequence control 6 produces a short pulse on line 43 which momentarily actuates switch $S_8$. The resulting momentary removal of anode voltage from gas triodes 16–18 extinguishes those that were conductive and restores the associated switches to their initial deenergized state. This completes the cycle of operation of the multiplier.

Figure 3:
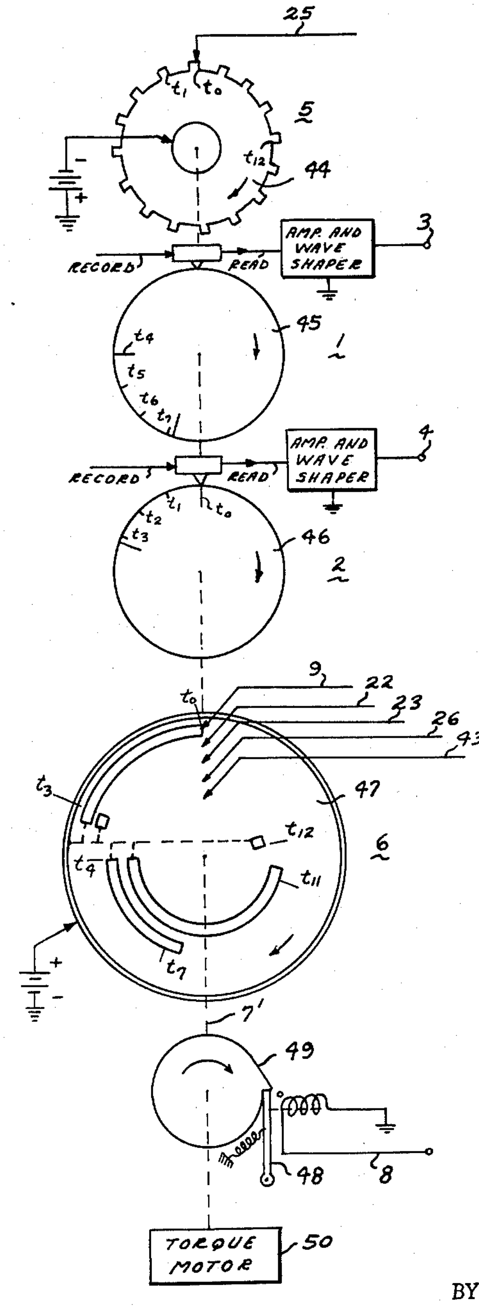
Fig. 3 represents schematically a possible construction of the input and control portion of Fig. 1.

The elements 5, 1, 2 and 6 of Fig. 1 would normally be electronic in nature utilizing any of the means known in the art for accomplishing their functions as described above. However, a simple electromechanical embodiment of these elements is shown in Fig. 3. In this embodiment, in which the reference numerals correspond to those used in Fig. 1, each of the elements 5, 1, 2 and 6 is a rotary device mounted on a common shaft 7′ which, in effect, performs the synchronizing function of line 7 in Fig. 1. The negative pulses on line 25 are generated by a contact wheel 44. The multiplicand and multiplier storage devices 1 and 2 are magnetic drums 45 and 46 on which the digits of the multiplicand and multiplier have been magnetically recorded earlier at the locations indicated by their times of entry into the multiplier cycle, as indicated in Fig. 2. The function of the sequence control circuit 6 is performed in this embodiment by a contact wheel 47 on which there are contacts having the proper locations and angular extents to produce the control voltages required by the multiplier apparatus. Upon application of a short start pulse to circuit 8, latch 48 for latched wheel 49 is momentarily withdrawn allowing shaft 7′ to make one complete revolution at a constant speed under the influence of torque motor 50. The multiplier cycle of operation is completed in one complete rotation of shaft 7′.

The various switches of the multiplier in Fig. 1 are shown as electromechanical for simplicity. These switches may be replaced by electronic types where greater speed of operation is required.

Also, for simplicity, the multiplier of Fig. 1 was restricted to a capacity of four digits for the multiplier and multiplicand. However, the procedures and apparatus described may be extended to accommodate binary numbers of any number of digits. Also the serial column adder 36 of Fig. 1 may be expanded to accommodate any number of column digits. The procedure is as follows: Let $n$=number of input variables exclusive of carries,
$c$=number of carries, and
$N=(n+c)$=input variables including carries.

(1) Approximate number of carries by determining maximum value of $c$ for which $2^c \leq n$.

(2) Add approximate value of $c$ to $n$ to find approximate value of N.

(3) Determine maximum value of $c$ for which $2^c \leq N$. If $c$ has different value from that determined in (1) recompute $(n+c)$ and solve for maximum value of $c$ again. Repeat until $c$ does not change. This is true value of $c$ which added to $n$ gives true value of N.

(4) Form a first adder section consisting, when N is even, of one basic 2-variable adder and $$\left(\frac{N}{2}-1\right)$$

basic 3-variable adders, or, when N is odd, consisting of $$\left(\frac{N-1}{2}\right)$$

3-variable adders, the adders in the section being cascaded by connecting the sum output of each basic adder to one of the inputs of the next basic adder in the cascade. The sum output of the last basic adder in the cascade constitutes the column sum.

(5) Letting $c'$ equal the number of carry outputs of the first adder section, form a second cascaded adder section consisting, when $c'$ is even, of one 2-variable adder and $$\left(\frac{c'}{2}-1\right)$$

3-variable adders, and when $c'$ is odd, consisting of $$\left(\frac{c'-1}{2}\right)$$

3-variable adders. Cascade second section with first section by connecting carry outputs of first section to remaining inputs of second section. The sum output of the second section constitutes the carry to the next higher order column. This output is delayed by an interval equal to one digit separation interval and applied to an input of the first section.

(6) Repeat (5), letting $c'$ equal the number of carry outputs of the preceding section, until a section containing a single basic 2-variable or 3-variable adder is formed. The sum outputs of the succeeding sections, with appropriate delays, are applied to inputs of the first section. The carry outputs of each succeeding section, save the last, are applied to the inputs of the next succeeding section. The carry output of the last section, appropriately delayed is applied to the input of the first section.

Figure 4:
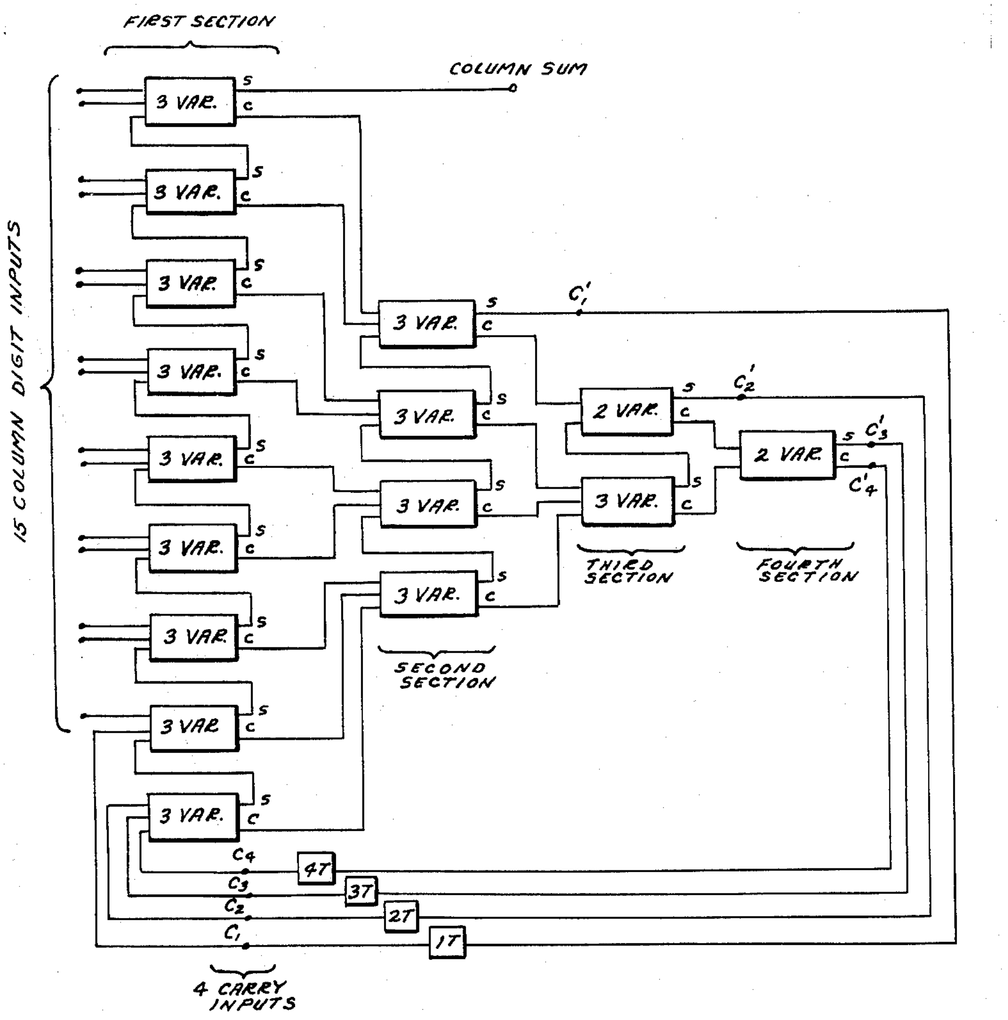
Fig. 4 illustrates the construction of a serial column adder for accommodating any predetermined number of column digits, in this case 15.

As a specific example, the design of a serial column adder for $n=15$ in accordance with the foregoing procedure is as follows, the resulting adder being shown in Fig. 4:

(1) Maximum value of $c$ for which $2^c \leqq 15$ is 3.

(2) $n+c=18$.

(3) Maximum value of $c$ for which $2^c \leqq 18$ is 4. $n+c=19$. Maximum value of $c$ for which $2^c \leqq 19$ is 4. Therefore 4 is true value of $c$, and true value of $N=n+c=19$.

(4) Since 19 is odd, first section consists of $$\left(\frac{N-1}{2}\right)=9$$

3-variable adders.

(5) Since $c'=9$ is odd, second section consists of $$\left(\frac{c'-1}{2}\right)=4$$

3-variable adders.

(6) (*a*) Since $c'=4$ is even, third section consists of one 2-variable adder and $$\left(\frac{c'}{2}-1\right)=1$$

3-variable adders. (*b*) Since $c'=2$ is even, fourth section consists of one 2-variable adder and $$\left(\frac{c'}{2}-1\right)=0$$

3-variable adders. Therefore fourth is last section.

Figure 5:
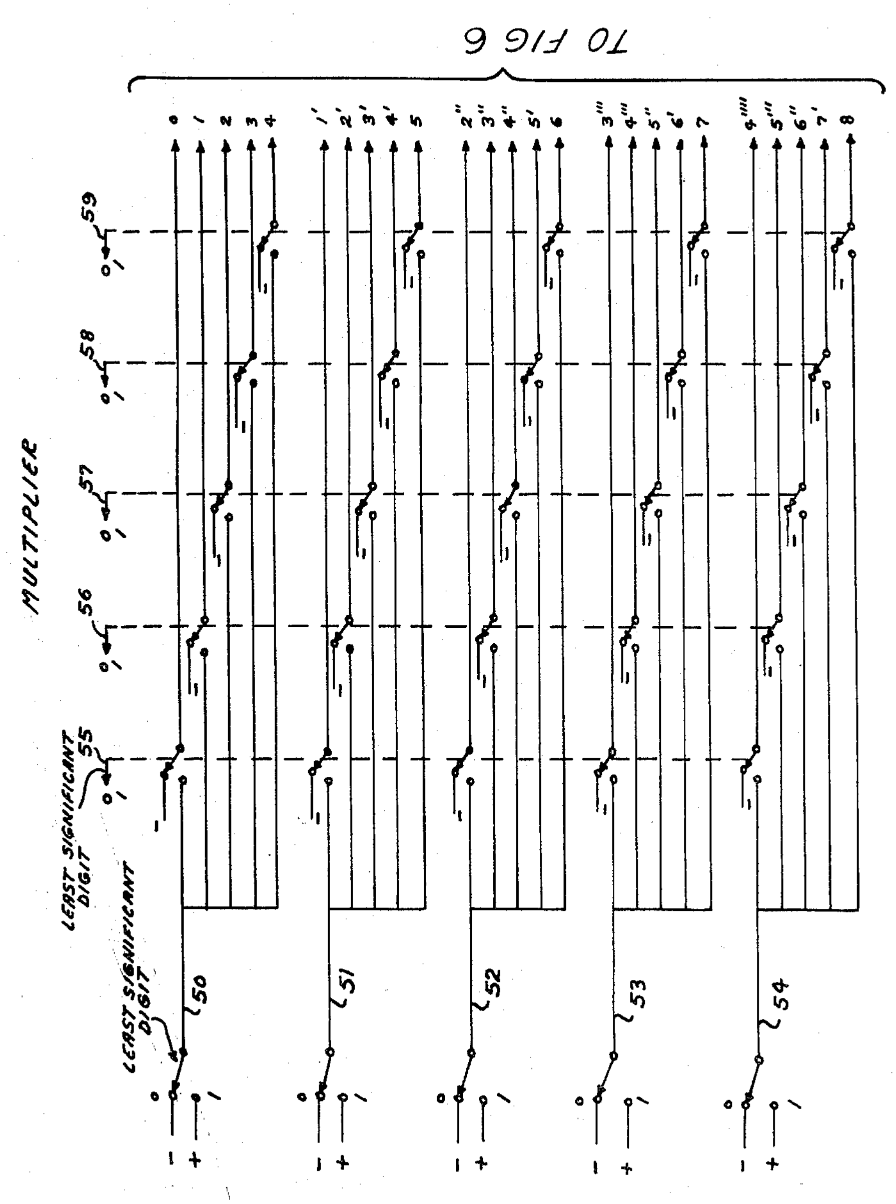
Figs. 5 and 6 illustrate a multiplier for binary numbers in parallel form.

Parallel multiplication, in which the electrical potential representing the multiplier and multiplicand occur simultaneously in separate circuits rather than in succession in the same circuit as serial multiplication, is performed by the apparatus shown in Figs. 5 and 6. For convenience the capacity of the multipler shown is limited to binary numbers of five digits, however, the structure and procedures shown can be extended to accommodates binary numbers of any number of digits.

Referring to Fig. 5, the digits of the multiplicand appear simultaneously on conductors 50—54 in the form of a voltage of positive polarity for the digit 1 and of negative polarity for the digit 0. These voltages may be supplied through the switches shown associated with conductors 50–54, the down position of a switch representing binary 1 and the up position binary 0. The voltage representing the least significant digit of the multiplicand appears on conductor 50 and that representing the most significant digit appears on conductor 54.

Switches 55–59 are set in accordance with the digits of the multiplier, switch 55 corresponding to the least significant digit and switch 59 corresponding to the most significant digit. Each switch is in its upper or lower position depending upon whether the corresponding multiplier digits is 0 or 1. Each switch has as many banks of S.P.D.T. contacts as there are digits in the mutiplicand. The function of switches 55–59 is to connect the appropriate partial product digit conductors to conductors 50–54 for the 1 digits in the multiplier and to connect the appropriate partial product digit conductors to negative potential for the 0 digits in the multiplier. The partial product digit conductors are numbered in accordance with the partial product digit column to which they pertain. For example, the partial product due to the least significant multipler digit appears on partial product digit conductors 0, 1', 2'', 3''' and 4'''' which, disregarding the primes, are numbered in accordance with the columns in which the digits of this partial product appear. Similarly, the partial product due to the second multiplier digit (switch 56) appears on conductors 1, 2', 3'', 4''' and 5'''; the partial product due to the third multiplier digit appears on conductors 2, 3', 4'', 5'' and 6''; etc.

As seen in Fig. 6, a parallel column adder is provided for each partial product digit column, except the least significant which contains only a single digit. The partial product digit columns in Fig. 6 are designated Col. 0 through Col. 8, Col 0 being the least significant. These adders are termed parallel column adders since they all produce their column sums and carries to higher order columns at the same instant, rather than column by column as for the serial column adder. The number of inputs required for each column adder is equal to the maximum number of partial product digits in the column plus the carries from lower order columns. For example, the adder for Col. 4 of Fig. 6 must accommodate five partial product digits and two carries so that a 7-variable column adder is required. The other column adders require various lesser numbers of inputs as indicated in Fig. 6. The additional 2-variable adder 60 is required because of the possibility of a carry from Col. 8. Lines $S_1$–$S_8$ are the sum outputs of the respective column adders. The digits of the final product appear simultaneously on lines $S_0$–$S_9$, the least significant appearing on line $S_0$. The column adders of more than 3 variables are made up of basic 2-variable and 3-variable adders and are shown in Figs. 6*a*, 6*b*, 6*c* and 6*d*.

Although, for simplicity, the multiplying apparatus of Figs. 5–6 is restricted to 5-digit binary numbers, the apparatus may be expanded to accommodate numbers of any desired number of digits. The expansion would merely involve duplication of the components shown in Figs. 5 and 6 for the higher order digits and the provision of parallel column adders of the required number of inputs. As in the case of serial column adders, parallel column adders of any number of input variables may be constructed from basic 2-variable and 3-variable adders. The design is similar to the design of serial column adders except that the number of carry inputs does not necessarily equal the number of carry outputs as in the case of the serial column adder. A somewhat simplified design procedure therefore results. The simplified procedure for designing an N-variable parallel column adder is as follows:

(1) Form a first adder section consisting, when N is even, of one basic 2-variable adder and $$\left(\frac{N}{2}-1\right)$$

basic 3-variable adders, or, when N is odd, consisting of $$\left(\frac{N-1}{2}\right)$$

3-variable adders, the adders in the section being cascaded by connecting the sum output of each basic adder to one of the inputs of the next basic adder in the cascade. The sum output of the last basic adder in the cascade constitutes the column sum.

(2) Letting $c'$ equal the number of carry outputs of the first adder sections, form a second cascaded adder section consisting, when $c'$ is even, of one 2-variable adder and $$\left(\frac{c'}{2}-1\right)$$

3-variable adders, and, when $c'$ is odd, consisting $$\left(\frac{c'-1}{2}\right)$$

3-variable adders. Cascade second section with first section by connecting carry outputs of first section to remaining inputs of second section. The sum output of the second section constitutes the carry to the next higher order column.

(3) Repeat (2), letting $c'$ equal the number of carry outputs of the preceding section, until a section containing a single basic 2-variable or 3-variable adder is formed. The carry outputs of each succeeding section, save the last, are applied to the inputs of the next succeeding section. The sum outputs of the succeeding sections plus the carry output of the last section constitute the carries to higher order columns.

As an example, the design of a 12-digit parallel column adder is as follows:

(1) Since $N=12$ is even, the first section consists of one 2-variable adder and $$\left(\frac{12}{2}-1\right)=5$$

3-variable adders.

(2) Since $c'=6$ for first section is even, the second section consists of one 2-variable and $$\left(\frac{6}{2}-1\right)=2$$

3-variable adders. Since $c'=3$ for second section is odd, third section is $$\left(\frac{3-1}{2}\right)=1$$

3-variable adder.

Suitable basic 2-variable and 3-variable adders for use in Figs. 1, 4, 6, 6*a–d* and 7 are shown in Figs. 8 and 9. The 2-variable adder of Fig. 8 will be described first.

The salient features of the circuit of Fig. 8 are as follows: The two inputs are designated *a* and *b* and are connected to the control grids of vacuum tubes 70 and 71, respectively. The suppressor grids of tubes 70 and 71 are connected to points 72 and 73 in the screen grid circuits of tubes 71 and 70, respectively. Point 74 in the common anode circuit of tubes 70 and 71 is connected to the control grid of tube 75 and the "sum" output is taken from a point 76 in its anode circuit. Points 72 and 73 are connected to the grids of tubes 77 and 78 and the "carry" output is connected to point 79 in the common anode circuit of these tubes. The points 76 and 79 are so selected that they may exhibit either positive or negative potentials relative to ground depending upon the conduction in the tubes 75, 77 and 78.

Consider first the operation of the circuit with positive pulses (binary 1) on both input terminals *a* and *b*. As already pointed out, the circuit under this condition should produce a negative sum potential (binary 0) at terminal *s* and a positive (binary 1) carry potential at terminal *c*. With + pulses at *a* and *b*, the screen grid currents of tubes 70 and 71 are high and the potentials of points 73 and 72 are relatively low. Since the suppressor grids of these tubes are connected to points 73 and 72, their potentials are also lowered. The lowered suppressor potentials decrease the anode currents in the tubes and increase the screen grid currents, which action results in a further lowering of the suppressor voltages. Finally a condition of stability is reached in which the screen current is very high and the anode current is very low or cut off entirely. In the presence of a small or zero anode current in both tubes the potential of point 74 is relatively high. This causes high conduction in tube 75 which reduces the potential of point 76 into the negative region. The required negative pulse (binary 0) on line *s* is therefore produced. Also, since the low potentials of points 72 and 73 on the grids of tubes 77 and 78 reduce their anode currents and raise their anode potentials, the point 79 is lifted into the positive region producing the positive (binary 1) carry on line *c* as required.

With a positive pulse (1) on one of the terminals *a* and *b* and a negative pulse (0) on the other, the tube having the positive pulse will also have a relatively high suppressor grid potential due to the high screen grid potential of the other tube which has a negative pulse on its control grid and therefore low screen current. The resulting high anode current of the tube receiving the positive pulse input lowers the potential of point 74 and the grid of tube 75. The resulting reduction in tube 75 anode current raises the potential of its anode and that of point 76 so that a positive pulse (binary 1) on line *s* is produced as required. Also the conduction in tubes 77 and 78 is sufficient to reduce the anode potential of these tubes enough to produce a negative potential (binary 0) at point 79 and line *c*, as required. This results from the fact that the grid of the tube 77—78 that is connected to the screen circuit of the tube receiving the negative input pulse will have its maximum value in the positive direction due to the low screen current, and the grid connected to the screen circuit of the tube receiving the positive input pulse will have a moderately high value in the positive direction due to partly reduced screen current caused by the high suppressor potential.

With negative potentials (binary 0) at both terminals *a* and *b*, negative potentials occur at both lines *s* and *c*, as required. The negative potential on line *s* results from the low anode conduction and high anode potential of tubes 70 and 71. This results in a relatively high potential at point 74, high anode current in tube 75, a low tube 75 anode potential and a resulting negative potential at point 76. The negative potential on line *c* results from the high screen potential of tubes 70 and 71. These potentials cause relatively high potentials on the grids of tubes 77 and 78 and the resulting high anode conduction in these tubes causes the potential of point 79 to fall into the negative region.

The 3-variable adder of Fig. 9 has input terminals designated *a*, *b* and *d*, a sum output designated *s* and a carry output designated *c*, these markings corresponding to those of basic 3-variable adder 38 in Fig. 1. The response of this adder to the various combinations of positive and negative input pulses is restated as follows:

| *a* | *b* | *d* | *s* | *c* |
|---|---|---|---|---|
| + | + | + | + | + |
| + | + | − | − | + |
| + | − | − | + | − |
| − | − | − | − | − |
| − | − | + | + | − |
| − | + | + | − | + |
| − | + | − | + | − |
| + | − | + | − | + |

The tubes 80 and 81 are interconnected in the same manner as tubes 70 and 71 of Fig. 8 and their operation is the same. Reviewing this operation, if terminals *a* and *b* are both positive the screen grid conduction in the two tubes is high and points 83 and 84 have negative potentials, Since the suppressor grids of these tubes are cross-connected to these points and are therefore negative also, substantially no anode current flows and point 82 has a positive potential resulting from the relatively high anode voltages. If points *a* and *b* are both negative, there is little or no conduction in either tube and points 82, 83 and 84 all have positive potentials. If one of the points *a* and *b* is positive and the other negative the anode conduction in the tube having the positive potential is high, being bolstered by the relatively high potential of its suppressor grid which is connected to the screen circuit of the other tube, so that its anode potential is relatively low and point 82 is negative. As for points 83 and 84 under this condition, the potential of the point associated with the conductive tube is negative and that of the point associated with the tube receiving the negative input is positive. Points 83 and 84 are connected to the suppressor grids of tubes 85 and 86 the function of which will be explained later.

Tubes 87 and 88 are interconnected in the same manner as tubes 80 and 81 and operate in the same manner. Point 82 is connected to the control grid of tube 87 and its potential serves as the input to this tube. Input terminal *d* is connected to the control grid of tube 88. The potential at point 89 is applied to the control grid of tube 86. Point 90, at which a positive or negative potential representing the sum digit is produced, is connected to the sum output terminal *s* and also to the control grid of tube 85.

Tubes 85 and 86 generate the positive or negative potential representing the carry. The anodes of these tubes are connected in parallel and supplied through a common resistor 91. The arrangement is such that if neither tube is conductive the potential of point 92 is positive (binary 1), while if either tube is conductive, the fall in anode potential is sufficient to lower point 92 into the negative region (binary 0). A negative potential on either the control or the suppressor grid will prevent conduction in tubes 85 and 86.

Applying the above operating characteristics to a specific situation, assume that positive pulses are simultaneously applied to terminals *a, b* and *d*. For this input, point 82 is positive and points 83 and 84 are negative. Tubes 87 and 88 receive their inputs from points 82 and terminal *d* and, with these inputs positive, point 90 is positive and point 89 is negative. The positive potential at point 90 gives a positive (binary 1) output at point *s*. The negative potential at point 83 prevents conduction in tube 85 (although 90 is +) and the negative potential at point 84 (and 89) prevents conduction in tube 86. Therefore point 92 is positive giving a positive potential (binary 1) at carry output terminal *c*. The other input situations indicated in the foregoing table may be traced through the circuit of the adder in a similar manner.

We claim:

1. Multiplying apparatus in which the multiplier, multiplicand and product are serial binary numbers the digits of which are represented by a succession of electrical pulses having a separation interval T with the pulse representing the least significant digit occurring first, said pulses being positive when the represented digit is 1 and negative when the represented digit is 0, said apparatus comprising: a partial product terminal corresponding to each digit of the multiplier; a source of negative pulses having a separation interval T; a multiplicand terminal; a normally unactuated switching means connected to each partial product terminal and operative in its unactuated state to connect said partial product terminal to said negative pulse source and operative in its actuated state to connect said partial product terminal to said multiplicand terminal said last named connection containing means producing a delay equal to the interval by which the multiplier digit to which the partial product terminal corresponds lags the least significant digit of the multiplier; an electrical actuating means for each of said switching means, each actuating means having first and second input circuits and operating in response to coincident positive pulses applied to its input circuits to actuate and hold actuated its associated switching means; an electrical delay line having as many delay points, including the zero delay point, as there are digits in said multiplier, the delay between successive points being equal to the interval T; means for applying the pulses representing the digits of said multiplier to the zero delay point of said line, least significant digit first; means connecting the first input circuit of the actuating means for the switching means connected to the partial product terminal corresponding to the least significant multiplier digit to the point of maximum delay on said line, and means similarly connecting the first input circuits of the actuating means for the switching means connected to the partial product terminals corresponding to the remaining multiplier digits of successively higher order to line points of successively lesser delay; means for applying positive pulses to the second input circuits of said actuating means simultaneously and coincidently with the application of the pulse representing the most significant digit of said multiplier to the zero delay point of said delay line; a normally unactuated multiplicand switching means operating in its unactuated state to connect said multiplicand terminal to said source of negative pulses and in its actuated state to apply the pulses representing said multiplicand to said multiplicand terminal, least significant digit first; means operative subsequently to the said simultaneous application of positive pulses to the second input circuits of said actuating means to actuate said multiplicand switching means for a period sufficient only to encompass the pulses representing said multiplicand, whereby the pulses representing said multiplicand are applied to said multiplicand terminal and thence to said partial product terminals at which they represent the partial products of corresponding order, the pulses appearing simultaneously on said partial product terminals representing the partial product digit columns; and a binary serial column adder having input circuits connected to said partial product terminals and a column sum output terminal at which pulses representing the digits of the product appear.

2. Apparatus as claimed in claim 1 in which said serial column adder produces carries to higher order columns and in which the number of input circuits of the column adder equals the number of multiplier digits plus the maximum number of carries to a column, means for delaying each carry produced by said column adder by a multiple of T as required to store said carry until the appearance at said partial product terminals of the pulses representing the partial product digit column to which it pertains, and means for applying said delayed carries to the remaining input circuits of said column adder.

3. Apparatus as claimed in claim 2 in which there is provided means operative after the occurrence of the pulse representing the most significant digit of the product at said column sum output terminal for restoring the switching means connected to said partial product terminals to their unactuated states.

4. An N-digit serial column adder for binary numbers, wherein N is an integer greater than 3, for providing a column sum and appropriate carries to higher order columns, consisting of a combination of basic two-variable and three-variable binary adders each producing from two and three digit binary inputs, respectively, a sum and a carry each of which is one of the two binary digits 1 and 0, said combination comprising: *m* cascaded adder sections, *m* being not less than 2, each, except the last section in the cascade, consisting of a plurality of said basic adders cascaded by connecting the sum output of each to an input of the next succeeding basic adder in the cascade, the last section consisting of a single basic adder; means for cascading said sections by connecting the carry outputs produced by the cascaded adders therein to the unused inputs of the next succeeding section in the section cascade, the unused inputs in the first section of said cascade being equal to N and the unused inputs in each succeeding section in said cascade being equal to the number of carry outputs of the preceding section, the sum produced by the cascaded adders of the first section constituting the column sum and the sums produced by the remaining sections and the carry produced by the last section in the section cascade constituting the carries to higher order columns; means for delaying each carry to a higher order column by an interval equal to the period between said serial columns multiplied by the number of the higher order column, with respect to the column being added, to which the carry belongs; and means for applying each of said delayed carries to one of the unused inputs of said first section; the first section, when N is even, consisting of one two-variable adder and $$\left(\frac{N}{2}-1\right)$$

three-variable adders and, when N is odd, consisting of $$\left(\frac{N-1}{2}\right)$$

three-variable adders; each remaining section consisting, when $c$ is even, of one two-variable adder and $$\left(\frac{c}{2}-1\right)$$

three-variable adders and, when $c$ is odd, consisting of $$\left(\frac{c-1}{2}\right)$$

three-variable adders, $c$ being the number of carry outputs of the preceding adder section in the section cascade.

5. An N-digit parallel column adder for binary numbers, wherein N is an integer greater than 3, for providing a column sum and appropriate carries to higher order columns consisting of a combination of basic binary adders of the two-variable and three-variable type each producing from two and three digit binary inputs, respectively, a sum and a carry each of which is one of the two binary digits 1 and 0, said combination comprising: $m$ cascaded adder sections, $m$ being not less than 2, each, except the last section in the cascade, consisting of a plurality of said basic adders cascaded by connecting the sum output of each to an input of the next succeeding basic adder in the cascade, the last section in the section cascade consisting of a single basic adder; means for cascading said sections by connecting the carry outputs produced by the cascaded adders therein to the unused inputs of the next succeeding section in the section cascade, the unused inputs in the first section of said cascade being equal to N and the unused inputs in each succeeding section in said cascade being equal to the number of carry outputs of the preceding section, the sum produced by the cascaded adders of the first section constituting the column sum and the sums produced by the remaining sections and the carry produced by the last section in the section cascade constituting the carries to higher order columns; the first section, when N is even, consisting of one two-variable adder and $$\left(\frac{N}{2}-1\right)$$

three-variable adders and, when N is odd, consisting of $$\left(\frac{N-1}{2}\right)$$

three-variable adders; each remaining section consisting, when $c$ is even, of one two-variable adder and $$\left(\frac{c}{2}-1\right)$$

three-variable adders and, when $c$ is odd, consisting of $$\left(\frac{c-1}{2}\right)$$

three-variable adders, $c$ being the number of carry outputs of the preceding adder section in the section cascade.

6. A six-digit serial column adder for providing a column sum and appropriate carries to the next two higher order columns for each column of a series of columns of simultaneously occurring binary digits in which the columns of said series are separated by a fixed time interval, said adder comprising: first, second, and third basic binary adders each having three inputs, a sum output and a carry output, and a fourth basic adder having two inputs, a sum output and a carry output; means connecting the sum output of said first basic adder to one of the inputs of said second basic adder; means connecting the sum output of said second basic adder to one of the inputs of said fourth basic adder; means connecting the carry outputs of said first, second and fourth basic adders to the three inputs of said third basic adder; means delaying the sum output of said third basic adder by the said column separation interval and applying said delayed sum output to an unused input in the group of inputs provided by said first, second and fourth adders; means delaying the carry output of said third adder by twice said interval and applying said delayed carry to an unused input of said group of inputs; and means for applying the column digits to the remaining unused inputs of said group, the column sum appearing at the sum output of said fourth basic adder.

References Cited in the file of this patent

UNITED STATES PATENTS

| | | |
|---|---|---|
| 2,638,267 | Hartley et al. | May 12, 1953 |
| 2,861,741 | Bire | Nov. 25, 1958 |
| 2,888,202 | Blankenbaker et al. | May 26, 1959 |